(12) United States Patent
Wang et al.

(10) Patent No.: US 6,677,105 B2
(45) Date of Patent: Jan. 13, 2004

(54) SELF-LUBRICATING LAYER FOR DATA STORAGE DEVICES

(75) Inventors: Po Wen Wang, San Jose, CA (US); Evan F. Cromwell, Redwood City, CA (US); Olu Atanda, Campbell, CA (US)

(73) Assignee: Toda Kogyo Corporation, Hiroshima-ken (JP)

( * ) Notice: Subject to any disclaimer, the term of this patent is extended or adjusted under 35 U.S.C. 154(b) by 259 days.

(21) Appl. No.: 09/848,589

(22) Filed: May 4, 2001

(65) Prior Publication Data

US 2001/0055702 A1 Dec. 27, 2001

Related U.S. Application Data

(63) Continuation-in-part of application No. 09/569,613, filed on May 12, 2000, now Pat. No. 6,430,114.

(51) Int. Cl.$^7$ .............................. G11B 11/00; G11B 7/24
(52) U.S. Cl. ............................. 430/271.1; 430/770.11; 430/945; 428/64.3; 428/64.6; 204/192.2; 204/192.26; 369/13.38
(58) Field of Search ................... 369/13.38; 428/64.3, 428/64.6; 204/192.2, 192.26; 430/945, 270.11, 271.1, 321

(56) References Cited

U.S. PATENT DOCUMENTS

| | | | | |
|---|---|---|---|---|
| 4,511,629 A | * | 4/1985 | Konno et al. ................ 428/522 |
| 4,721,640 A | * | 1/1988 | Kato et al. ...................... 428/65 |
| 4,898,774 A | | 2/1990 | Yamashita et al. .......... 428/336 |
| 4,929,500 A | | 5/1990 | Yamashita et al. .......... 428/336 |
| 5,031,055 A | * | 7/1991 | Yanagisawa ................. 360/75 |
| 5,198,934 A | | 3/1993 | Kubo et al. ................... 360/104 |
| 5,231,613 A | | 7/1993 | Nakayama et al. ............ 369/13 |
| 5,239,425 A | * | 8/1993 | Kazama .......................... 360/59 |
| 5,447,796 A | | 9/1995 | Tsukamoto et al. .......... 428/408 |
| 5,453,884 A | | 9/1995 | Ohta et al. ..................... 369/13 |
| 5,525,392 A | | 6/1996 | Baum et al. ................. 428/65.5 |
| 5,568,466 A | | 10/1996 | Komaki et al. .......... 369/275.2 |
| 5,754,500 A | * | 5/1998 | Tanaka et al. ................. 369/13 |
| 5,793,553 A | | 8/1998 | Smith ......................... 360/74.1 |
| 5,862,105 A | * | 1/1999 | Nishimura .................... 369/13 |
| 5,870,362 A | | 2/1999 | Boutaghou ............... 369/44.14 |
| 5,871,810 A | | 2/1999 | Starcke et al. .............. 427/226 |
| 5,881,042 A | | 3/1999 | Knight .......................... 369/99 |
| 5,883,872 A | * | 3/1999 | Kino ........................... 369/112 |
| 5,919,560 A | | 7/1999 | Nishimori .................... 428/333 |
| 5,936,928 A | | 8/1999 | Jain et al. ....................... 369/99 |
| 5,949,600 A | * | 9/1999 | Akiyama et al. ............. 360/55 |
| 5,949,612 A | | 9/1999 | Gudeman et al. ......... 360/97.01 |
| 6,055,220 A | | 4/2000 | Mamin et al. ............... 369/112 |
| 6,055,222 A | | 4/2000 | Knight ......................... 369/112 |
| 6,106,919 A | | 8/2000 | Lee et al. .................. 428/64.1 |
| 6,117,544 A | | 9/2000 | Hirokane et al. ........... 428/336 |
| 6,150,038 A | | 11/2000 | Hirokane et al. ........... 428/638 |
| 6,359,852 B1 | * | 3/2002 | Ueyanagi .................... 369/118 |
| 6,430,114 B1 | * | 8/2002 | Wang et al. ............. 369/13.38 |
| 6,482,330 B1 | * | 11/2002 | Bajorek ....................... 216/22 |

OTHER PUBLICATIONS

PCT Written Opinion for Application No. PCT/US01/15455, Mar. 25, 2002 (4 pages).

* cited by examiner

*Primary Examiner*—Martin Angebranndt
(74) *Attorney, Agent, or Firm*—Nixon & Vanderhye P.C.

(57) ABSTRACT

A silicon nitride self-lubricating layer forms the upper surface of a data storage device, such as a rotating disk or a non-rotating memory device, e.g., a credit card-type memory device using a memory strip. The silicon nitride self-lubricating layer can replace the carbon protective overcoat and liquid lubricant used in conventional data storage devices. The silicon nitride self-lubrication layer provides the desired lubrication and protection between the slider and the data storage device. The silicon nitride layer also will not evaporate under high temperatures found in an optical data storage system. In addition, a data storage device may include a plastic polymer layer over which an iron oxide material is deposited. The use of a plastic polymer layer and iron oxide recording layer is particularly advantageous because a low temperature deposition process can be used with the iron oxide material.

21 Claims, 6 Drawing Sheets

SELF-LUBRICATING LAYER FOR DATA STORAGE DEVICES

CROSS-REFERENCE TO RELATED APPLICATIONS

This application is a continuation-in-part and claims priority to U.S. Ser. No. 09/569,613, filed May 12, 2000, now U.S. Pat. No. 6,430,114.

BACKGROUND

1. Field of the Invention

This invention relates to the use of a self-lubricating layer for a data storage device, and more particularly to a silicon nitride self-lubricating layer for a data storage device.

2. Description of Related Art

Rigid disks with thin-film recording layers are a popular method for storing digital data. In a hard disk drive, a magnetic disk is installed on a spindle motor and driven to rotate. Hard disk drives utilize an actuator for positioning a read/write head over the spinning disk. The read/write head includes an electromagnetic transducer contained within an aerodynamic "slider." In conventional hard drive systems, when the disk is stationary, the slider rests on the surface of the disk. When the disk is rotated at high speeds, an air bearing is formed beneath the slider, which supports the slider slightly above the surface of the disk. The slider and disk surface are typically made extremely smooth so that the slider is capable of flying very close to the disk surface without impacting protrusions on the disk surface.

One problem encountered with air bearing-based disk storage systems occurs when the disk first begins its rotation. When the disk is stationary, the slider experiences static adhesion, or stiction, with the disk surface, particularly when both the slider and disk surfaces are very smooth. Thus, when the disk begins its rotation, the stiction between the slider and the disk can result in damage to either or both the slider and the disk. In addition, in order for the slider to fly at low heights above the disk surface, there must be good lubrication between the slider and the disk. To avoid such damage, conventional magnetic disks are provided with a diamond-like carbon (DLC) overcoat for protection and a thin layer of perfluoronated polyether (PFPE) liquid lubricant, possibly mixed with a solvent, such as PF-5060, available from the 3M Corp. of St. Paul, Minn.

The deposition of the carbon protective overcoat and the liquid lubricant requires additional processing steps, which add to the complexity of the manufacturing process. After the carbon overcoat is sputter deposited over the recording layer, the lubricant layer is applied by immersing the disk in the liquid lubricant solution. The disk is then drawn out of the lubricant to produce a uniform liquid lubricant layer over the outer surface of the disk. After lubrication, the disk is then processed through a tape burnishing step, in which a very fine abrasive tape is used to burnish both sides of the hard disk to ensure particle removal and to reduce surface asparities.

Another popular method for storing data in computer-readable form is optical recording. As used herein, the term "optical storage" refers to all computer-readable data storage systems in which data is either written or read through the use of a laser. Various kinds of optical systems are known, including but not limited to compact disk read only memories (CD-ROMs), and erasable optical data storage systems, such as phase-change and magneto-optic (MO) systems. In typical optical systems, a laser beam is focused from an optical head to record data on the recording layer of an optical disk. A small spot is generated on the recording layer modulating, for example, the phase, intensity, polarization, or reflectivity of a readout optical beam which is subsequently detected by a detector in the optical head.

MO systems typically include a data storage disk having a substrate, a magnetic recording layer, and a protective overcoat. To record data, a small portion of the recording layer is heated by a laser beam, which enables the magnetization direction of the recording layer to be switched by application of an external magnetic field. In phase-change type storage systems, information is recorded onto a disk by utilizing a recording film which is rendered in an amorphous state when heated to a given temperature (for instance, about 600° C.) higher than the melting point and then rapidly cooled and is recrystallized when heated to a temperature (for instance, about 400° C.) lower than the melting point and then slowly cooled. Recorded information is reproduced by utilizing the fact that the reflectance of light in the amorphous state is different than in the crystal state. In typical optical and MO systems, the laser can heat the desired recording portion to temperatures of 400° C. and above.

Conventional optical and MO data storage systems utilize a suspended read/write head which is mounted above the disk surface at distances of over 20 micro-inches ($\mu$"). Because of the large distance between the read/write head and the recording layer in such "far field" suspended head systems, the recording spot size is large and, accordingly, the recording density is poor. Recently, however, there has been development in the use in optical storage systems of air bearing-supported read/write heads, similar to the flying sliders in magnetic hard disk drives. The use of sliders enables the read/write head to be brought much closer to the disk surface, thereby improving the recording density. In conventional hard disk drives, the read/write head may be supported by the air bearing at a distance of approximately 20–30 nm from the disk surface.

Present data storage disk systems present numerous disadvantages. The deposition of the carbon overcoat for protection and a PFPE liquid layer for lubrication requires multiple steps and multiple layers in order for the read/write head to effectively fly close to the disk surface. The solvents used for liquid lubrication are expensive and may be environmentally hazardous. In addition, liquid lubricants are not thermally stable and can be evaporated by exposure to high heat. In optical and magneto-optical recording, in which the laser in the read/write head can create extremely high localized temperatures, depletion of the lubricant layer through evaporation can result in a significant degradation in performance.

Other types of non-rotating data storage devices may also be read from and written to with slider read/write heads, and thus experience the same problems as found in rotating disks. For example, smart cards, which are credit card-type storage devices, include a rectangular shaped strip that serves as the storage medium, and use read/write heads that move over the surface of the storage medium in a linear fashion. Similar to rotating disks, an air bearing is formed to support the slider. Non-rotating data storage devices have similar lubrication requirements as found in traditional hard disk drives.

Accordingly, there is a need for an improved system for storing data on a data storage device, which provides good, reliable lubrication and does not require additional complex processing steps.

SUMMARY

In accordance with the invention, a method of operating an electronic data storage device comprises providing a data storage disk, said disk comprising a substrate, a recording layer deposited over said substrate, and a silicon nitride self-lubricating layer deposited over said recording layer, and rotating said disk to create an air bearing to support a slider, wherein said silicon nitride self-lubricating layer provides lubrication between said disk and said slider.

In accordance with another aspect of the present invention, a disk for use with a slider that is supported by an air bearing comprises a substrate, a recording layer deposited over said substrate, and a silicon nitride self-lubricating layer deposited over said substrate and forming an upper surface of said disk, said silicon nitride self-lubricating layer providing lubrication between said slider and said disk when said slider contacts said disk.

In accordance with another aspect of the present invention, an apparatus comprises a disk comprising a substrate, a recording layer deposited over said substrate, and a silicon nitride self-lubricating layer forming an upper surface of said data storage disk, a slider supported by an air bearing created by rotation of said data storage disk, and an actuator for positioning said slider.

In accordance with another aspect of the present invention, a data storage device for use with a slider comprises a substrate, a recording layer deposited over the substrate, and a silicon nitride self-lubricating layer deposited over the recording layer to form an upper surface on the recording layer. The silicon nitride self-lubricating layer provides lubrication between the recording layer and a slider. In one embodiment, the data storage device has a memory strip, wherein the memory strip includes the substrate, recording layer and the silicon nitride self-lubricating layer. The data storage device may include a second substrate with a slot that the memory strip is removably stored in. In another embodiment, the memory strip is positioned on the exterior surface of a second substrate. The memory strip may be deposited over only a portion of the substrate. Thus, for example, where the data storage device is a credit card-type storage device, the substrate may be the card itself, and the recording layer and the silicon nitride layer may be deposited as a strip over a portion of one of the side of the card. In another embodiment, a plastic polymer is deposited over the substrate and the recording layer is deposited over the plastic polymer. The recording layer may be an iron oxide material, which when deposited over a plastic polymer is particularly advantageous because of the low temperature associated with the deposition process of the iron oxide material.

In accordance with another embodiment of the present invention, a method of manufacturing the data storage device includes providing a substrate, depositing a recording layer over the substrate and depositing a silicon nitride layer over the recording layer, such that the silicon nitride layer forms an upper surface on the recording layer. A plastic polymer may be deposited over the substrate and the recording layer is deposited over the plastic polymer. As described above, the recording layer may be an iron oxide material. The silicon nitride layer may be sputter deposited, for example using direct-current reactive sputtering. The process of sputtering the silicon nitride includes introducing nitrogen and argon gas into the sputtering chamber. The ratio of nitrogen and argon may be between approximately 3.3 to 6.7. The substrate, recording layer, and silicon nitride layer may form a memory strip used, e.g., on a credit card-type storage device.

In another aspect of the present invention, a data storage device for use with a slider includes a substrate, a plastic polymer layer deposited over the substrate and an iron oxide recording layer deposited over the plastic polymer. The data storage device may also include a silicon nitride self-lubricating layer deposited over the recording layer to form an upper surface over the recording layer. The data storage device may include a memory strip that is comprised of the substrate, the plastic polymer and the recording layer. The memory strip may be stored in a second substrate or mounted on the exterior of a second substrate. Alternatively, the plastic polymer layer and the recording layer may be deposited over only a portion of the substrate.

BRIEF DESCRIPTION OF THE DRAWINGS

For a more complete understanding of the present invention and for further features and advantages, reference is now made to the following description taking in conjunction with the accompanying drawings, in which.

DETAILED DESCRIPTION OF THE PREFERRED EMBODIMENTS

The preferred embodiments of the present invention and their advantages are best understood by referring to FIGS. 1–4 of the drawings. Like numerals are used for like and corresponding parts of the various drawings.

Figure 1:
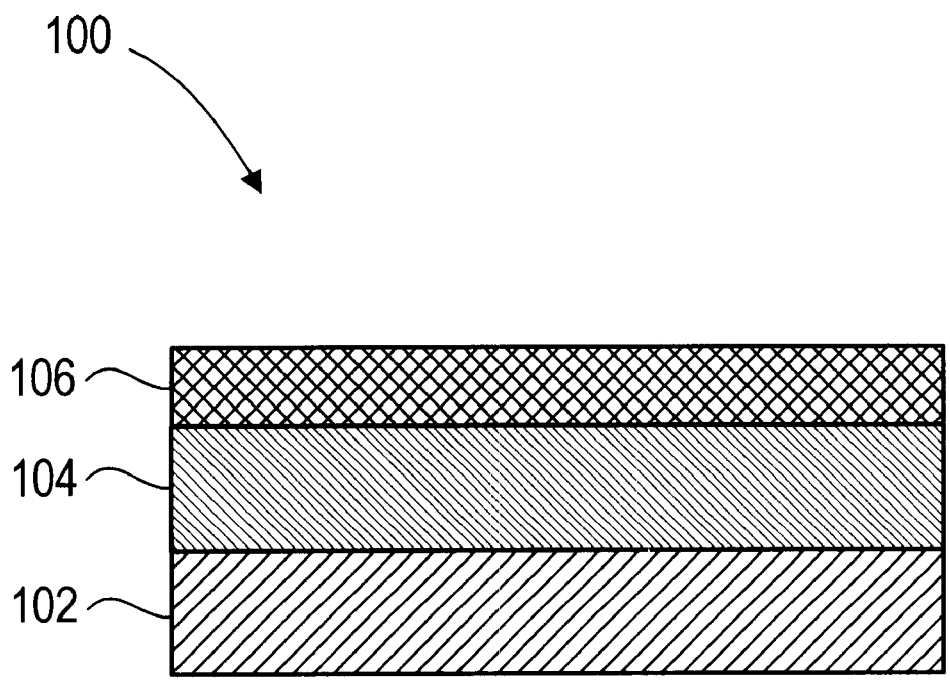
FIG. 1 shows a cross-section of a data storage disk in accordance with an embodiment of the present invention.

In accordance with a first embodiment of the present invention, a substrate 102 shown in FIG. 1, formed of, for example, glass-ceramic or NiP-plated aluminum having a 95 mm×31.5 mil form factor, is coated with multiple layers for use in a data storage disk 100. An exemplary substrate 102 is model no. TS-10-SX-SP, available from the Ohara Corp. Substrate 102 is then washed and dried.

Next, a recording layer 104 is deposited on top of the substrate 102. As used herein, the term "outer surface" or "upper surface" is intended to refer to the outermost surface of the data storage disk. For simplicity, this discussion refers to the substrate as being the bottommost layer, and each successive layer being formed "on top of" or "over" the substrate. It is understood that these are relative terms and that identical processes can also be performed on the opposite side of the substrate to form a double-sided data storage disk.

In various embodiments, the recording layer 104 can comprise a plurality of layers deposited on top of the substrate 102. These layers may assist directly or indirectly with the recording of data onto the data storage disk 100. In one embodiment for use in a magnetic disk storage system, an adhesion/nucleation layer formed of, for example, chromium or chromium alloy is sputter deposited onto the substrate 102. Next, an active magnetic layer is sputter deposited onto the adhesion/nucleation layer.

Any of a number of known magnetic materials can be employed in the production of the active layer. Such conventional magnetic materials, include, but are not limited to, cobalt (Co)-base alloys, such as cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtTaB). Cobalt-base alloys having a thickness of about 100 Å to about 1000 Å have been found suitable for the active magnetic layer. The adhesion and active magnetic layers comprise recording layer 104.

In another embodiment for use in an optical disk storage system, the recording layer 104 comprises a different plurality of layers. First, a reflective adhesion layer formed of, for example, aluminum or aluminum alloy is deposited on top of the substrate 102. Next, a dielectric layer formed of, for example, silicon nitride, $SiO_2$, or $Al_2O_3$, is deposited on top of the reflective layer. Finally, an active optical layer formed of, for example, GeSbTe, CoFeTb, or CoFeGd, is deposited on top of the dielectric layer. Numerous variations of the recording layer 104 in the disk 100 are well-known to those of ordinary skill in the art.

A self-lubricating layer 106 is then deposited on top of the recording layer 104. In one embodiment, the self-lubricating layer 106 is a silicon nitride layer deposited in a direct current (DC) sputter process, as will be described in more detail below. A single self-lubricating layer 106 may advantageously serve multiple functions. First, the self-lubricating layer 106 serves as a protective layer for recording layer 104 in case of head-disk interaction or other impact on the surface of the disk 100. Next, the self-lubricating layer 106 serves as protection against corrosion. In addition, a disk 100 with a self-lubricating layer 106 can be used in an air bearing-type data storage recording system without the use of an additional fluid lubricant because the self-lubricating layer 106 provides sufficient lubrication between the read/write head of the slider and the disk 100. Furthermore, when self-lubricating layer 106 is the only layer disposed between the recording layer 104 and the read/write head, the total distance between the recording layer 104 and the read/write head can be reduced, which increases signal strength.

The use of DC sputtering to deposit the silicon nitride self-lubricating layer 106 provides numerous advantages. First, DC sputtering generally results in a higher deposition rate than RF sputtering, thereby increasing processing throughput. In addition, the DC sputter systems are generally simpler than the RF sputter systems.

In accordance with embodiments of the present invention, a silicon nitride self-lubricating layer 106 was deposited onto a recording layer 104, which was formed on a glass substrate 102. The silicon nitride self-lubricating layer 106 was deposited using a MDP-250A DC sputter system, available from Intevac, Inc., of Santa Clara, Calif. During deposition, 1.6 kW of power was applied in the sputter tool for 15 seconds. A silicon target was provided inside the sputter chamber, and argon (Ar) gas was pumped into the evacuated chamber at a constant flow rate of 6 sccm. Table I below summarizes the properties of the silicon nitride self-lubricating layer 106 deposited as a result of varying the amount of nitrogen ($N_2$) gas introduced with the Ar gas, thereby modifying the nitrogen:argon gas ratios.

TABLE I

| | Disk # | | | | |
|---|---|---|---|---|---|
| | 1 | 2 | 3 | 4 | 5 |
| $N_2$:Ar Ratio | 3.3 | 3.75 | 4.17 | 5.0 | 5.8 |
| Index of Refraction (n) | 1.83 | 1.95 | 2.15 | 2.13 | 2.1 |
| Absorption Coefficient (k) | 0.008 | <0.001 | <0.001 | <0.001 | <0.001 |
| Thickness | 307 Å | 209 Å | 98 Å | 82 Å | 71 Å |
| Reflectivity | 35% | 42% | 49% | 50% | 51% |

To deposit the silicon nitride self-lubricating layer 106 on disk 1, nitrogen gas was pumped into the sputter chamber at 20 sccm, and 1.6 kW of power was applied for 15 seconds. This formed a self-lubricating layer 106 having a thickness of 307 Å on top of the magnetic layer 104. Testing of disk 1 indicated that the index of refraction (n) of this self-lubricating layer 106 was 1.83 at a wavelength of 6500 Å, the absorption coefficient (k) was 0.008, and the reflectivity was 35%. It is generally desirable to have the absorption coefficient be close to zero, to provide substantially 100% pass through of the optical energy from the read/write head. In addition, it is also generally desirable that any layers deposited above the active optical layer have an index of refraction well matched to that of the underlying active optical layer to provide good coupling of light. The results for disks 2–5 are listed above in Table I. While oxygen is not intentionally incorporated into layer 106, it has been determined that oxygen is somehow incorporated into the self-lubrication layer 106 either during or after the deposition process. Oxygen is approximately 10 to 20 atomic percent of the self-lubrication layer 106, and thus, the silicon nitride layer 106 may be characterized as a SiON layer.

Figure 2:
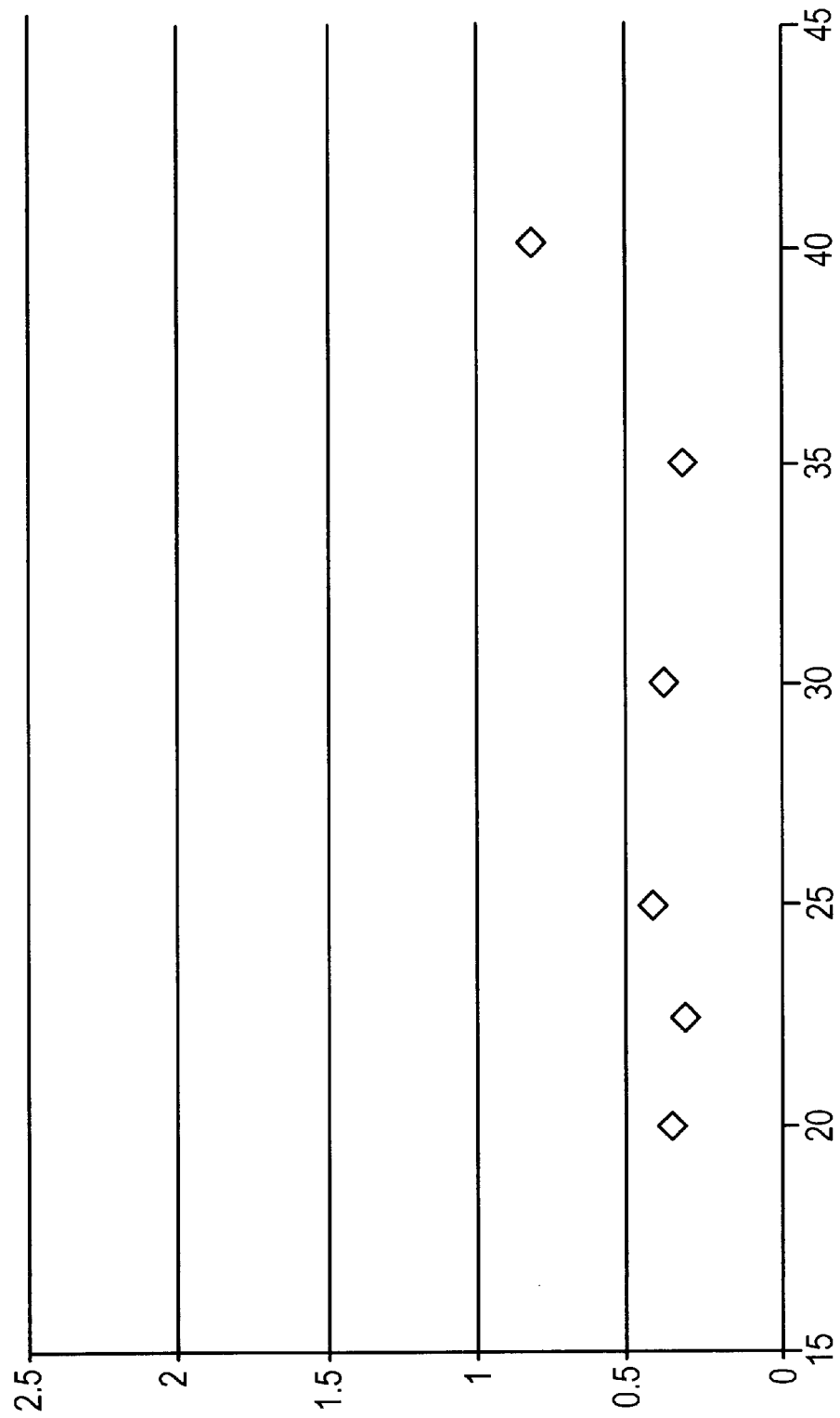
FIGS. 2–3 are charts illustrating the properties of a self-lubricating layer in accordance with embodiments of the present invention.
Figure 3:
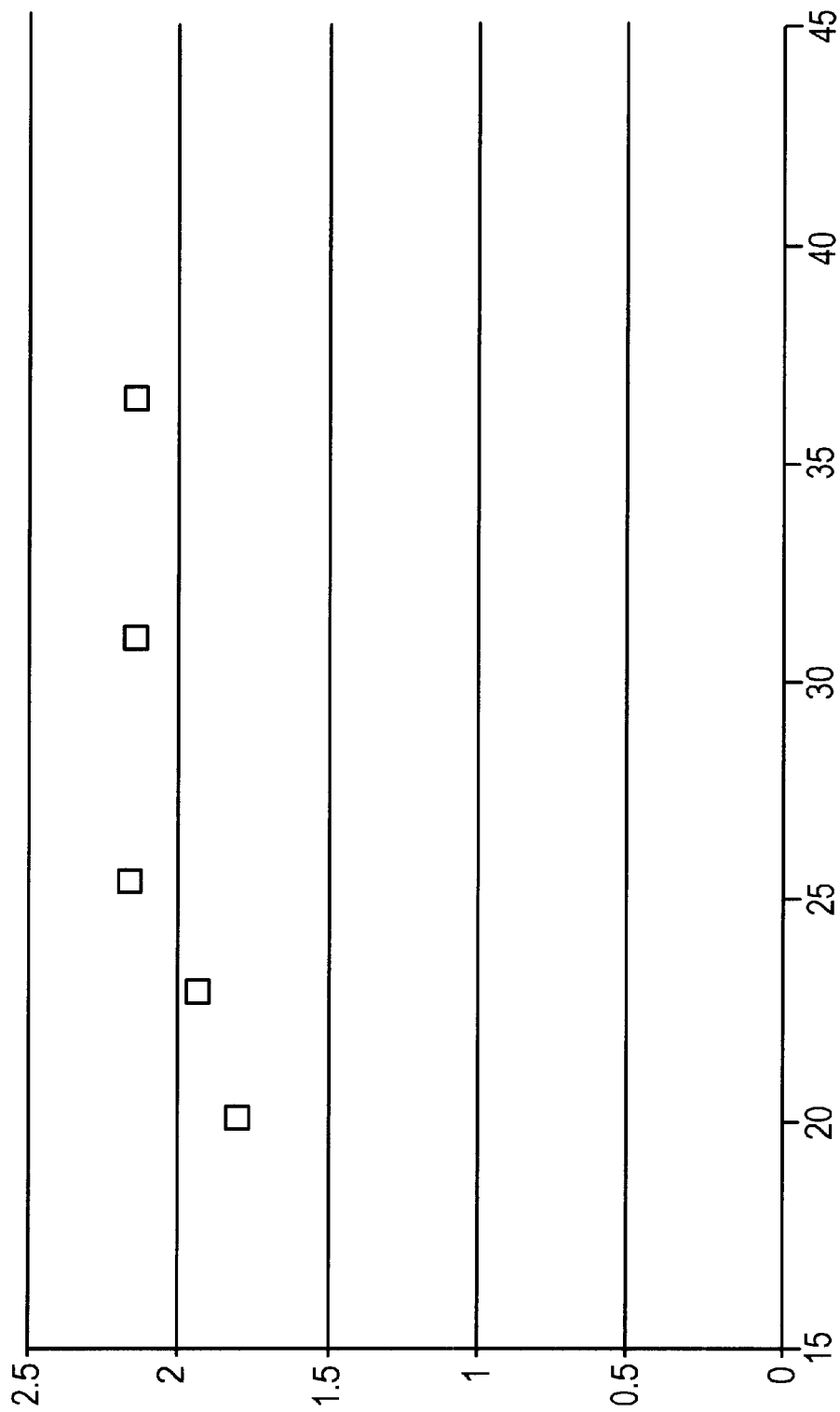

FIGS. 2–3 illustrate the performance of silicon nitride self-lubricating layers 106 applied using varying nitrogen flows, in accordance with embodiments of the present invention. Again, the self-lubricating layers 106 were applied in a DC sputter chamber containing a silicon target, using a power of 1.6 kW with an argon gas flow rate of 6 sccm. The total pressure in the chamber ranged from 6–12 mtorr. The power was applied for a period of 15 seconds, using nitrogen flow rates of 20–40 sccm, as indicated by the x-axis.

FIG. 2 shows the change in glide avalanche point in micro-inches ($\mu$") corresponding to changes in the nitrogen flow rate. Glide tests are well-known methods for testing disk surfaces for defects and as a measure for surface lubricity. During a glide test, a glide head including a piezoelectric transducer (PZT) flies over the disk surface at a predetermined clearance from the disk surface, known as the glide height. If contact occurs between the glide head and a disk defect or asperity, the glide head vibrates and deforms, which generates a potential difference between the electrodes of the PZT. The glide avalanche point occurs when the magnitude of measured voltages exceed predetermined threshold values. The ability to fly at low heights with low glide noise indicates good lubricity of the disk surface as well as low surface roughness, for example approximately 30 Å Ra or less, and preferably approximately 10 Å Ra or less.

As shown in FIG. 2, when the silicon nitride self-lubricating layer 106 is deposited using nitrogen flow rates of less than 40 sccm, and less than 35 sccm in particular, the glide avalanche point is observed to be less than 0.5µ". Even at 40 sccm, the glide avalanche point remains below 1.0µ".

FIG. 3 shows the index of refraction for the five sample disks plotted in FIG. 2. It can be seen that a nitrogen gas flow rate of 25 sccm and above produces a self-lubricating layer 106 which has an index of refraction greater than 2.0, when measured using 650 nm wavelength light. For some embodiments used with optical disk systems, it is desirable that the layers deposited over the active layer have an index of refraction greater than 2.0. Therefore, the self-lubricating layers 106 produced with nitrogen flows of over approximately 23 sccm exhibit particularly desirable optical qualities. In addition, as shown in Table I, the absorption coefficient (k) is less than 0.001 for the disks having a nitrogen:argon ratio of 3.75 and above. A low absorption coefficient is important for good optical recording.

Figure 4:
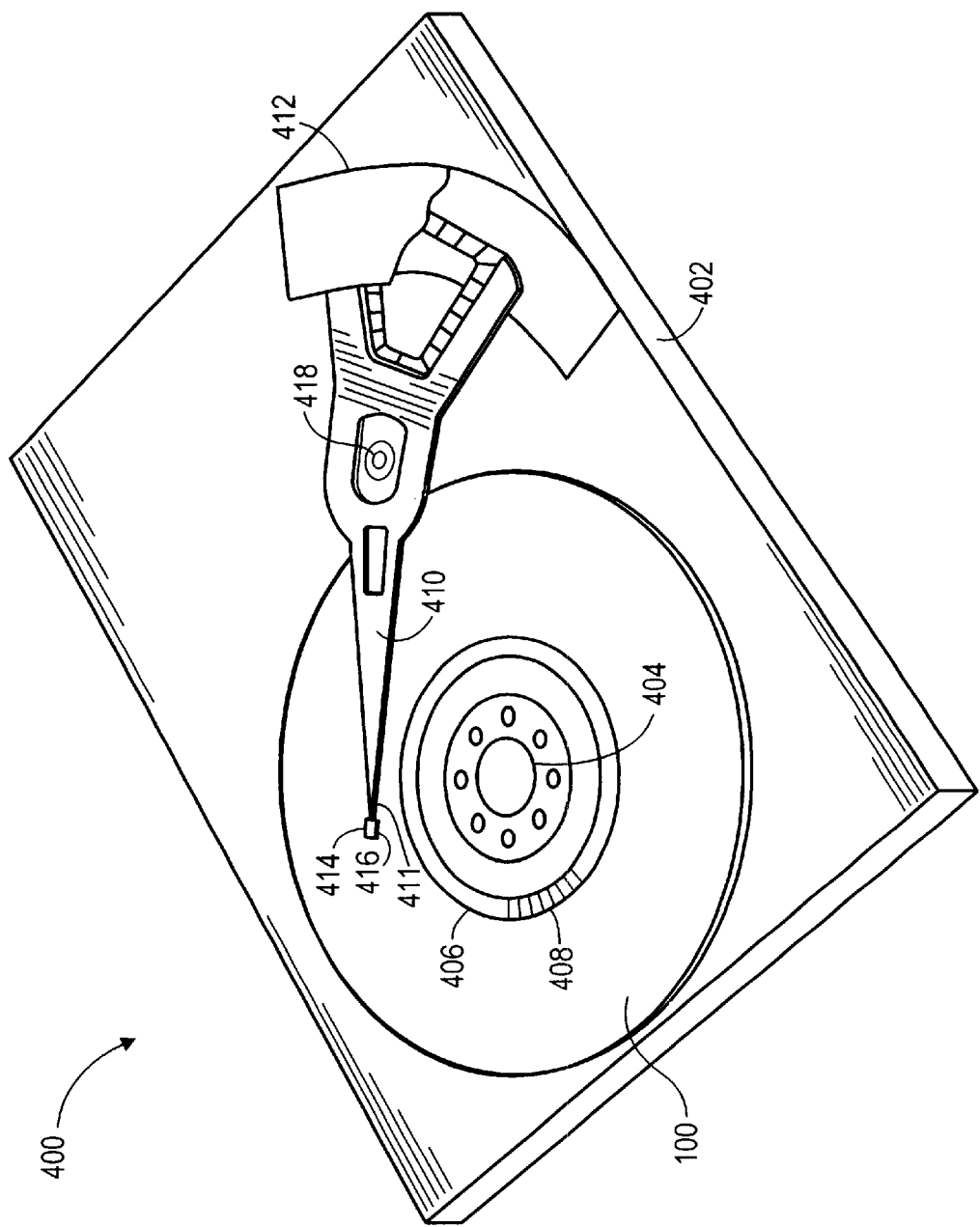
FIG. 4 shows an isometric view of a data storage system in accordance with an embodiment of the present invention.

Disks 100 prepared in accordance with embodiments of the present invention may be incorporated into a data storage system 400, as illustrated in FIG. 4. One or more disks 100 are mounted onto a base 402 through a motor-driven spindle 404. Each disk 100 is formatted to include a plurality of concentric tracks 406, each track 406 being partitioned into a plurality of sectors 408. The data being stored on disk 100 is stored in individual bit fields within each sector 408.

An actuator 410 having a distal end 411 is selectively radially positionable adjacent the disk surface. A read/write head 416 is carried on a slider 414 that is coupled to the distal end 411 of the actuator 410. The actuator 410 is pivotable about an axis 418, and voice coil motor 412 rotates the actuator 410 about the axis 416 to position the read/write head 416 over a desired track 406 on disk 100. As used herein, the term "read/write head" is intended to refer to a class of mechanisms, which are used to read and/or write data on a thin-film recordable storage medium. In inductive magnetic recording, a single electromagnet can be used to both read and write data. It is understood that in some storage systems, such as in conventional CD-ROM players, the read/write head is capable of only reading data from the disk. In other systems, the read/write head includes separate components for reading and writing data, as is the case for conventional magneto-optical systems and magnetoresistive (MR) media. When writing data in a magneto-optical system, a laser is used in conjunction with an electromagnetic writing component to orient the crystals in the recording medium. When reading the data, a laser and sensor are used to determine the orientation of the recorded crystals. It is intended that "read/write head" include all mechanisms which are used for either reading or writing on a data storage device.

In data storage systems 400 utilizing the contact start stop (CSS) method, when the spindle 404 is not rotating disk 100, the slider 414 rests on the surface of the disk 100. When the spindle 404 rotates the disk 100, an air bearing is formed between the slider 414 and the disk 100, thereby supporting the slider 414 and allowing the slider 414 to fly over the disk surface. By flying over the surface of the medium, the slider 414 avoids irregularities in the disk's surface that would otherwise cause rapid wear and ultimately compromise data.

In an alternative embodiment, a data storage system 400 can utilize well-known load/unload techniques. As in CSS systems, when the spindle 404 is rotating the disk 100 at sufficiently high speeds, an air bearing supports the slider 414 over the disk surface. In load/unload systems, unlike CSS systems, a ramp is used to lift the slider 414 before the disk 100 stops rotating, thereby preventing the slider 414 from coming to a rest on top of a stationary disk 100.

While it is known to use silicon nitride as a protective layer in some magneto-optical disks, such systems utilize suspended read/write heads instead of air bearings. As a result, the distance between the read/write head is significantly greater than in systems utilizing air bearings and a flying slider, and the need for lubrication and a low roughness surface is eliminated.

In conventional systems in which an air bearing and slider is used, a liquid lubricant, such as PFPE, must be applied to the surface of the disk in order to prevent damage to the disk. In accordance with embodiments of the present invention, however, the silicon nitride self-lubricating layer 106 provides sufficient lubrication between the slider 414 and the disk 100 such that no additional lubrication is needed. The silicon nitride self-lubricating layer 106 additionally provides sufficient mechanical protection for the recording layer 104 so that a separate protection layer may not be needed. The above-described embodiments also eliminate the prior need for additional lube and tape burnishing steps, because the single self-lubricating layer 106 provides both protection and lubrication. In addition, the solid silicon nitride self-lubricating layer 106 will not evaporate under high operating temperatures, which eliminates the problems caused by the depletion of conventional fluid lubricants. This is particularly advantageous when used in optical data storage systems, in which a laser from the read/write head 416 may heat the disk 100 to extremely high temperatures.

It will be understood that various embodiments of the present invention may utilize different compositions of silicon nitride, $Si_xN_y$, wherein x and y are variable, depending on the embodiment.

Moreover, the present invention may be used with non-rotating data storage devices. For example, the present invention may be used advantageously with credit card-type devices, which use, e.g., a memory strip. The use of a self-lubricating layer is particularly useful when a read/write data head is used to read or write data on the data storage device. For example, U.S. Pat. No. 6,131,816, issued Oct. 17, 2000, which is incorporated herein by reference, describes a data system that reads and writes on credit card-type storage devices using a read/write data head.

Figures 5A, 5B:
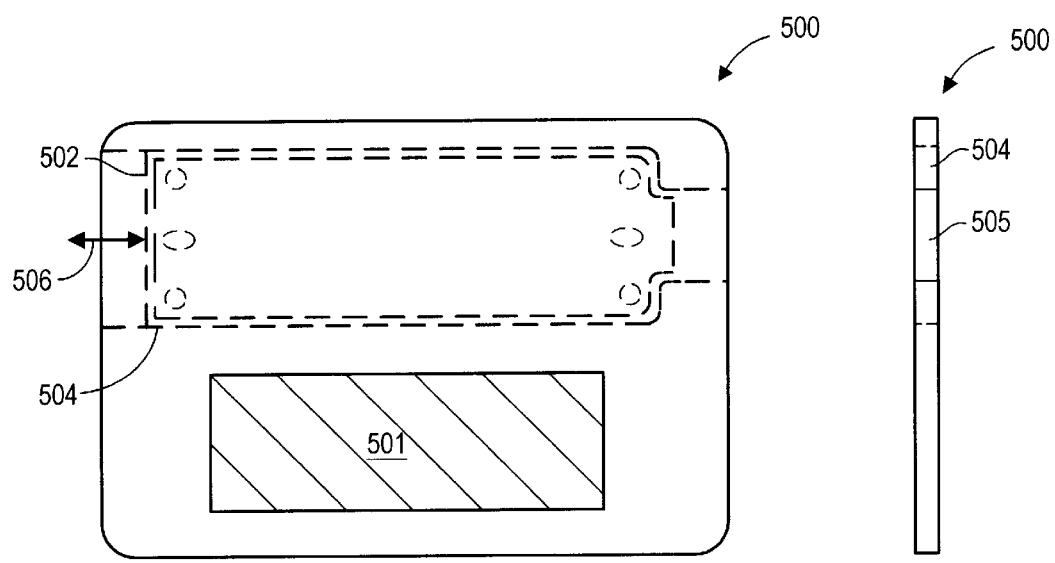
FIGS. 5A and 5B show the front and side views, respectively, of a credit card-type data storage device that uses a memory strip in accordance with the present invention.
Figure 6:
FIG. 6 shows a front view of memory strip removed from the card shown in FIG. 5A.

FIGS. 5A and 5B show the front and side views, respectively, of a credit card-type data storage device ("card") 500. Card 500 includes a memory strip 502 that stores the desired data and an embossed letter area 501. Memory strip 502 includes a recording material and a self-lubricating layer similar to layer 106 described in FIG. 1. Memory strip 502 is inserted and stored in a slot 504 in card 500. Slot 504 includes a push slit 505 on one side of card 500 to push memory strip 502 out of card 500 as indicated by arrow 506. To read data from or write data to strip 502, memory strip 502 is removed from card 500, e.g., by pushing memory strip 502 out of card 500, as indicated by arrow 506. Memory strip 502 is then read from or written upon using, e.g., a read/write head as described in U.S. Pat. No. 6,131,816. Memory strip 502 is then reinserted into card 500, as indicated by arrow 506. FIG. 6 shows a front view of memory strip 502 removed from card 500.

Figure 7:
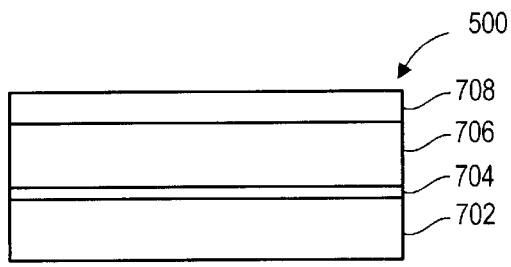
FIG. 7 is a cross-sectional view of the memory strip.

FIG. 7 is a cross-sectional view of memory strip 502. Memory strip 502 includes a substrate 802, which may be e.g., a copper-tin-nickel alloy (CuSnNi) or a copper-beryllium (CuBe) alloy. The memory strip 502 is generally e.g., 3 inches inch by 0.75 inches and 0.010 inches thick and may be, for example, purchased from UltraCard, Inc. located in Los Gatos, Calif. The memory strip 502 includes a tab 503 that when stored in slot 504 is proximate to push slit 505.

Memory strip 502 also includes a number of round holes 503a–503d, and elliptical holes 503e and 503f, which are used to hold the memory strip 502 during reading and writing.

The substrate 702 is then plated with a nickel phosphorous (NiP) layer 704, e.g., to approximately 500 microinch thick using electroless NiP plating. Layer 704 is then polished in a conventional manner, such as with a planetary polish using an alumina slurry. In another embodiment, layer 704 is a plastic polymer that covers substrate 702. A plastic polymer, such as Ultem® from GE Plastics, located in Pittsfield, Mass., (or similar polymers) is adequate for us as layer 704. The plastic polymer layer 704 may be deposited using meniscus coating, spray coating or possibly spin coating. Plastic polymer layer 704 is, e.g., 1–5 $\mu$m thick with the surface roughness Ra approximately 5–30 Å and the microwaviness Wa approximately less than 10 Å. The thin plastic polymer layer 704 has advantageous mechanical properties resembling those of the underlying substrate as opposed to the bulk polymer properties, which, for example, help to avoid damage caused by head slapping.

The recording layer 706 is then deposited on top of the nickel layer 704. It should be understood that while recording layer 706 is shown on one side of substrate 702, recording layer 706 may be used on both sides of substrate 702.

As with recording layer 104 described in reference to FIG. 1, the recording layer 706 can comprise a plurality of layers. These layers may assist directly or indirectly with the recording of data onto the memory strip 502. For example, an adhesion/nucleation layer of chromium or chromium alloy sputter deposited onto nickel layer 704 may be used. The active magnetic layer is sputter deposited onto the adhesion/nucleation layer.

Any of a number of known magnetic materials can be employed in the production of the active recording layer. For example, the magnetic materials that may be used, include, but are not limited to cobalt (Co)-base alloys, such as cobalt-chromium (CoCr), cobalt-chromium-cadmium (CoCrCd), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtTaB). Cobalt-base alloys having a thickness of about 100 Å to about 1000 Å have been found suitable for the active magnetic layer. The adhesion and active magnetic layers comprise recording layer 706.

In another embodiment, iron oxide based materials may be used for the magnetic material. For example, Co-$_x$Fe$_2$O$_3$ may be used for recording layer 706, which may be purchased, e.g., from Toda Kogyo Corp. located in Japan. With the addition of a few percent cobalt, the coercivity of the magnetic material is improved. The use of an iron oxide magnetic material is advantageous as it provides high density recording performance, low noise characteristics, high reliability and low cost.

The combination of a plastic polymer layer 704 and an iron oxide layer 706 is particularly advantageous. With use of a plastic polymer layer 704, the iron oxide layer 706 may be deposited at a low temperature, e.g., less than 200 C. Conventional deposition of iron oxide on NiP plated aluminum or glass is greater than 250 C. The low temperature deposition of iron oxide layer 706 produces a coercivity, e.g., of 3000 oersted or above. The combination of a plastic polymer layer with an overlying iron oxide layer may also be used with a rotating disk embodiment, such as that described above. Moreover, this particularly advantageous combination may be used with or without an overlying self-lubricating layer if desired, but it should be understood that provides additional advantages as described above in reference to FIG. 1.

In another embodiment for use in an optical disk storage system, the recording layer 706 comprises a different plurality of layers similar to those described in reference to layer 104 in FIG. 1.

The self-lubricating layer 708, if desired, is then deposited on top of the recording layer 706. Self-lubricating layer 708 is similar to layer 106 described in FIG. 1. For example, layer 708 may be, e.g., a silicon nitride layer deposited in a direct current (DC) sputter process. The deposition of self-lubrication layer 708 is similar to that described above. Self-lubrication layer 708 is deposited to be, e.g., approximately 100 Å thick and has a roughness of approximately 30 Å RA or less.

Figures 8A, 8B, 8C:
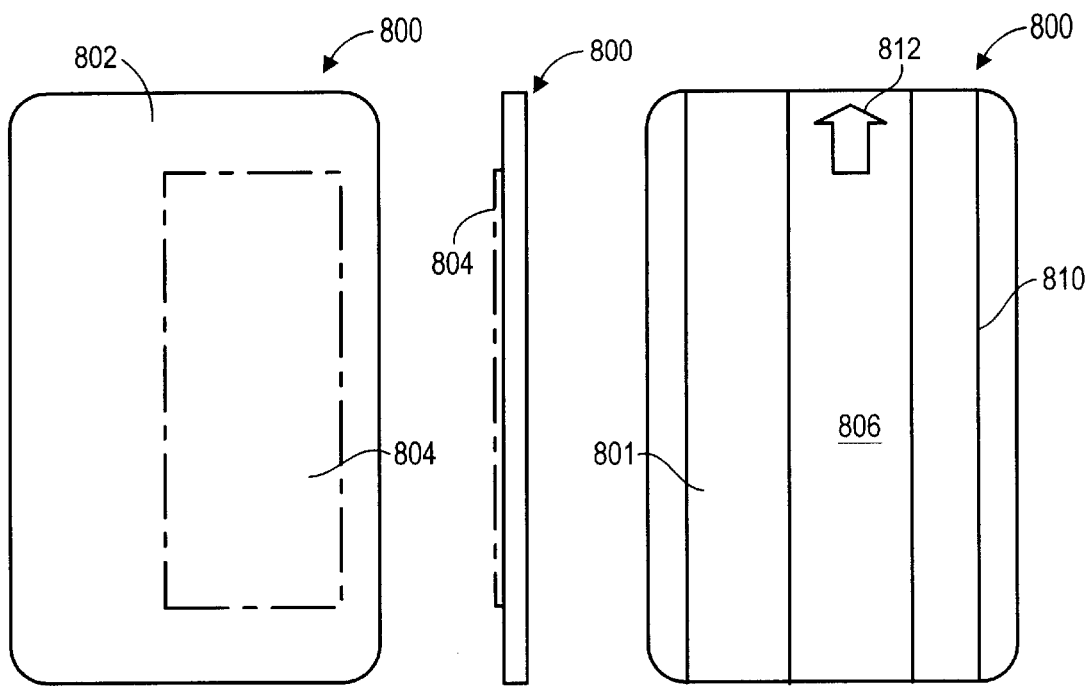
FIGS. 8A, 8B, and 8C show a front, side and rear view of a credit card-type substrate that uses a memory strip, in accordance with another embodiment of the present invention.

In another embodiment of the present invention a credit card-type structure 800, shown in FIGS. 8A, 8B, and 8C, includes a memory strip 801 on the back side 806 of the card 800, which includes a recording material and a self-lubricating layer similar to layer 106 described in FIG. 1. FIGS. 8A, 8B, and 8C show a front, side and rear view of a credit card-type substrate 800, in accordance with an embodiment of the present invention. FIG. 8A illustrates the front side 802 of card 800 having an embossed letter area 804, shown in the side view of FIG. 8B. FIG. 8C shows the back side 806 of card 800 having memory strip 801. The back side 806 may also include, e.g., a magnetic, typically ferrous oxide, strip 810 similar to that used with conventional credit cards.

As shown in FIG. 8C, a portion of side 806 may be covered by memory strip 801. In some embodiments it may be desired to cover most or all of surface 806 with memory strip 801. A directional arrow 812 may also be included to aid the user in proper insertion of card 800 into a card reader.

A card similar to card 800 without the self-lubricating layer, and the card reader with which the card may be used are described in U.S. Pat. No. 6,131,816, issued Oct. 17, 2000, which is incorporated herein by reference.

Memory strip 801 may be produced in a manner similar to that described in FIG. 7. In one embodiment, card 800 is, e.g., a sandwich construction 0.51 mm (0.020 inch) thick ceramic core and upper and lower surfaces made of a plastic polymer material about 0.13 mm (0.005 inch) thick, such as Ultem®. In this embodiment, the substrate 702 in FIG. 7 is the ceramic core and the layer 704 is the plastic polymer material. The recording strip 801 may be masked off followed by the deposition of the recording layer 706 and the self-lubricating layer 708, if desired.

Figure 9:
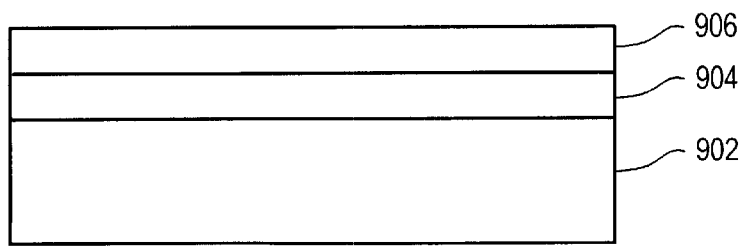
FIG. 9 shows a cross sectional view of a memory strip used with the card shown in FIG. 8C.

In another embodiment, card 800 is manufactured using a suitable plastic polymer without a ceramic core. FIG. 9 shows a cross sectional view of card 800 where substrate 902 is manufactured from a suitable plastic. Plastic substrate 902 is then covered with recording layer 904, which is similar to layer 706 in FIG. 7. The self-lubricating layer 906 may then deposited over the recording layer 906, if desired.

Although the invention has been described with reference to particular embodiments, the description is only an example of the invention's application and should not be taken as a limitation. In particular, even though much of the preceding discussion was directed to particular types of computer-readable storage media, alternative embodiments of this invention may be used in any type of data storage device, including rotating and non-rotating devices in which a lubricating or protective overcoat is desirable, such as where a flying slider is used or in an optical data storage system. Various other adaptations and combinations of features of the embodiments disclosed are within the scope of the invention as defined by the following claims.

We claim:

1. A data storage device for use with a slider, said data storage device comprising a memory strip comprising:
   a first substrate;
   a recording layer deposited over said first substrate;
   a silicon nitride self-lubricating layer deposited over said recording layer and forming an upper surface on said recording layer, wherein said silicon nitride self-lubricating layer provides lubrication between said slider and said recording layer; and
   said data storage device further comprising a second substrate being a card having a slot, said memory strip being removably stored in said slot.

2. The data storage device of claim 1, said data storage device wherein said memory strip being positioned on an exterior surface of said second substrate.

3. The data storage device of claim 1, wherein said recording layer and said silicon nitride layer are deposited over a portion of said first substrate.

4. The data storage device of claim 1, further comprising:
   a polymer layer deposited over said first substrate, said recording layer deposited over said polymer layer.

5. The data storage device of claim 4, wherein said recording layer is an iron oxide material.

6. The data storage device of claim 1, wherein said silicon nitride self-lubricating layer has a surface roughness of approximately 30 Å or less.

7. The data storage device of claim 6, wherein said silicon nitride self-lubricating layer has a surface roughness of approximately 10 Å or less.

8. A method of manufacturing a data storage device to be used with a slider, said method comprising:
   forming a memory strip comprising:
      providing a substrate;
      depositing a recording layer over said substrate; and
      depositing a silicon nitride layer over said recording layer, said silicon nitride layer forms an upper surface on said recording layer;
   forming a second substrate being a card having a slot, said memory strip being removably inserted in said slot.

9. The method of claim 8, further comprising:
   depositing a polymer over said substrate;
   wherein said recording layer is deposited over said polymer.

10. The method of claim 9, wherein said recording layer comprises iron oxide.

11. The method of claim 8, wherein depositing said silicon nitride layer comprises sputtering silicon nitride on said recording layer.

12. The method of claim 11, wherein sputtering comprises direct-current sputtering.

13. The method of claim 11, wherein sputtering is performed in a sputter chamber into which nitrogen and argon gas is introduced.

14. The method of claim 13, wherein a nitrogen:argon ratio is from approximately 3.3 to approximately 6.7.

15. The method of claim 8, wherein said silicon nitride layer has a surface roughness of approximately 30 Å or less.

16. The data storage device of claim 15, wherein said silicon nitride layer has a surface roughness of approximately 10 Å or less.

17. A data storage device for use with a slider, said data storage device comprising:
   a memory strip, said memory strip comprising:
      a substrate;
      a polymer layer deposited over said substrate; and
      an iron oxide recording layer deposited over said polymer layer;
   a second substrate being a card having a slot, said memory strip being removably stored in said slot.

18. The data storage device of claim 17, further comprising a silicon nitride self-lubricating layer deposited over said recording layer and forming an upper surface on said recording layer, wherein said silicon nitride self-lubricating layer provides lubrication between said slider and said recording layer.

19. The data storage device of claim 18, wherein said silicon nitride self-lubricating layer has a surface roughness of approximately 30 Å or less.

20. The data storage device of claim 19, wherein said silicon nitride self-lubricating layer has a surface roughness of approximately 10 Å or less.

21. The data storage device of claim 17, wherein said polymer layer and said recording layer are deposited over a portion of said substrate.

* * * * *